United States Patent
Takada (10) Patent No.: US 8,068,982 B2
(45) Date of Patent: Nov. 29, 2011

(54) ON-VEHICLE NAVIGATION SYSTEM

(75) Inventor: Takayuki Takada, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 929 days.

(21) Appl. No.: 12/048,888

(22) Filed: Mar. 14, 2008

(65) Prior Publication Data

US 2008/0249710 A1    Oct. 9, 2008

(30) Foreign Application Priority Data

Apr. 6, 2007  (JP) ................................. 2007-100471

(51) Int. Cl.
*G01C 21/16* (2006.01)

(52) U.S. Cl. .............. 701/209; 701/23; 701/25; 701/26; 701/28; 701/205; 701/210; 701/216; 701/217; 340/995.1; 340/995.14; 340/995.19; 340/995.21; 340/995.25; 382/181; 382/182; 382/229; 382/321

(58) Field of Classification Search ........................ None
See application file for complete search history.

(56) References Cited

U.S. PATENT DOCUMENTS

| | | | | |
|---|---|---|---|---|
| 5,761,630 | A * | 6/1998 | Sekine et al. | 701/301 |
| 6,018,697 | A * | 1/2000 | Morimoto et al. | 701/209 |
| 6,295,503 | B1 * | 9/2001 | Inoue et al. | 701/209 |
| 6,804,604 | B2 * | 10/2004 | Yamazaki | 701/211 |
| 7,898,437 | B2 * | 3/2011 | Okada et al. | 340/995.25 |
| 2001/0021895 | A1 * | 9/2001 | Yamazaki | 701/211 |
| 2005/0055158 | A1 * | 3/2005 | Machino | 701/209 |
| 2005/0071080 | A1 * | 3/2005 | Sano | 701/209 |
| 2005/0288855 | A1 * | 12/2005 | Sano | 701/209 |
| 2006/0253249 | A1 * | 11/2006 | Bruelle-Drews | 701/209 |
| 2007/0016367 | A1 * | 1/2007 | Sakashita et al. | 701/211 |
| 2007/0050134 | A1 * | 3/2007 | Hayashida et al. | 701/209 |
| 2007/0208504 | A1 * | 9/2007 | Lee | 701/208 |
| 2010/0076676 | A1 * | 3/2010 | Machino | 701/201 |

FOREIGN PATENT DOCUMENTS

JP   2000-131085   5/2000

* cited by examiner

*Primary Examiner* — Jack Keith
*Assistant Examiner* — Jonathan M Dager
(74) *Attorney, Agent, or Firm* — Brinks Hofer Gilson & Lione (57) ABSTRACT

An on-vehicle navigation system reliably performs guidance of a necessary exiting authorized section while avoiding the guidance of a needless exiting authorized section on a plural-lane road having a normal lane and a special lane where advancing from the normal lane in a predetermined advancing authorized section and exiting to the normal lane in a predetermined exiting authorized section are authorized. After discriminating whether the vehicle is driving in the special lane of the plural-lane road based on whether a characteristic object has been detected by a characteristic object detecting section, the guidance of an exiting authorized section is avoided in the case where the vehicle deviated from a recommended route including a special lane, and the guidance of an exiting authorized section is performed in the case where the vehicle deviated from a recommended route not including a special lane and drives in a special lane.

20 Claims, 3 Drawing Sheets

ON-VEHICLE NAVIGATION SYSTEM

RELATED APPLICATION

The present application claims priority to Japanese Patent Application Number 2007-100471, filed Apr. 6, 2007, the entirety of which is hereby incorporated by reference.

BACKGROUND OF THE INVENTION

1. Field of the Invention

The present invention relates to an on-vehicle navigation system, and particularly relates to an on-vehicle navigation system for performing route guidance for a vehicle to a destination along a recommended route.

2. Description of the Related Art

Conventionally, in an on-vehicle navigation system, after searching a recommended route from a current position to a destination by using a route calculation method such as Dijkstra's method, route guidance for a vehicle from the current position to the destination (in other words, route guidance) has been performed along the recommended route. Further, in this type of on-vehicle navigation system, before searching a recommended route, search conditions of a recommended route such as a route passing through an expressway can be set by user operation, for example, and a user thus was able to receive route guidance along a recommended route satisfying the set search conditions.

Freeways in big cities in the U.S. have roads equipped with a special lane, referred to as carpool lane, together with a normal lane. The carpool lane is a lane provided with the intent of removing a traffic jam, reducing exhaust gas, shortening commuting time or the like, and public buses, cars and motorcycles with two or more passengers (the specified number of passengers differing among states) can use the lane. However, hybrid cars can use the lane even in the case of one passenger if application is made to the motor vehicle official of a state government agency and permission is granted. If a vehicle that does not satisfy such requirements enters the carpool lane, the driver is fined for the violation. Legal advancing from the normal lane to the carpool lane is authorized only from a predetermined advancing authorized section (in other words, entrance), and legal exiting to the normal lane is authorized only from a predetermined exiting authorized section (in other words, an exit). Note that the exiting authorized section matches the advancing authorized section in many cases in such a carpool lane.

Some on-vehicle navigation systems capable of previously setting whether such a carpool lane should be used or not as a search condition of a recommended route have conventionally been suggested (Japanese Patent Laid-open No. 131085/2000, for example). However, there has conventionally been a case where the user deviated from a recommended route including the carpool lane to drive on the normal lane due to various circumstances. In such a case, even though he/she did not drive in the carpool lane, guidance of an exiting authorized section of carpool lane was provided as part of route guidance along the recommended route, and it caused a problem that users became confused or irritated.

Conversely, there has been a case where the user deviated from a recommended route not including the carpool lane to drive in the carpool lane. In such a case, the user conventionally had to confirm the exiting authorized section for returning to the recommended route without being unable to depend on the route guidance of an on-vehicle navigation system. However, since it is difficult to find the exiting authorized section of carpool lane in many cases, there has been a problem that the user could miss a chance of returning to the recommended route by choosing a wrong exiting authorized section.

SUMMARY OF THE INVENTION

The present invention has been made in view of such problems, and it is an object of the invention to provide an on-vehicle navigation system in which the guidance of a necessary exiting authorized section is securely performed while the guidance of a needless exiting authorized section can be avoided, so that the user can receive comfortable and efficient route guidance to a destination after accurately discriminating the driving condition of a vehicle on a plural-lane road having a normal lane and a special lane where advancing from the normal lane in a predetermined advancing authorized section and exiting to the normal lane in a predetermined exiting authorized section are authorized.

To achieve the foregoing object, the on-vehicle navigation system according to the present invention is characterized in that the system includes: a characteristic object detecting section for detecting the characteristic object unique to a special lane in the case where a vehicle drives in the special lane of plural-lane road having a normal lane and a special lane where advancing from the normal lane in a predetermined advancing authorized section and exiting to the normal lane in a predetermined exiting authorized section are authorized; a route searching section for searching a recommended route to a destination; a route guidance section for performing route guidance of the vehicle to the destination including the guidance of the exiting authorized section along the recommended route searched by the route searching section; a special lane driving judging section for performing special lane driving judgment being a judgment that the vehicle is driving in the special lane in the case where the characteristic object has been detected by the characteristic object detecting section; a first route deviation judging section for performing a first route deviation judgment being a judgment that the vehicle deviates from the recommended route including the special lane in the case where the special lane driving judgment by the special lane driving judging section is not performed in a predetermined driving section on the plural-lane road even though the special lane is included in the recommended route searched by the route searching section; a second route deviation judging section for performing a second route deviation judgment being a judgment that the vehicle deviates from the recommended route not including the special lane in the case where the special lane driving judgment by the special lane driving judging section is performed on the plural-lane road even though the special lane is not included in the recommended route searched by the route searching section; a first control section for controlling the route guidance action of the route guidance section to prevent the guidance of the exiting authorized section from being performed in the case where the first route deviation judgment by the first route deviation judging section has been performed; and a second control section for controlling the route guidance action of the route guidance section so as to perform the guidance of the exiting authorized section for returning to the recommended route in the case where the second route deviation judgment by the second route deviation judging section has been performed.

Note that the characteristic object is not limited to a tangible object but may be an intangible object in this specification.

Further, another embodiment of an on-vehicle navigation system according to the present invention is characterized in that a predetermined driving section on the plural-lane road is a driving section where the vehicle is presumed to be driving in the special lane, assuming that the vehicle does not deviate from the recommended route including the special lane based on the transition of driving lane with the running distance regarding the recommended route on the plural-lane road and an accumulated driving distance of the vehicle on the plural-lane road.

Moreover, another embodiment of an on-vehicle navigation system according to the present invention includes: a map data storage device in which map data is stored; a vehicle position detecting section for detecting a vehicle position by using at least one of dead reckoning and radio navigation; and a map matching processing section for performing a map matching process where the vehicle position is matched with a position on an appropriate road in the map data by using the vehicle position detected by the vehicle position detecting section and the map data stored in the map data storage device, in which the first route deviation judging section and the second route deviation judging section are configured so as to recognize that the vehicle is driving on the plural-lane road based on the result of a map matching process by the map matching processing section.

Furthermore, another embodiment of an on-vehicle navigation system according to the present invention includes: an activating section for activating the characteristic object detecting section in the state where the section is capable of detecting the characteristic object after detecting that the vehicle starts driving on a plural-lane road.

Further, another embodiment of an on-vehicle navigation system according to the present invention is characterized in that the activating section is configured so as to detect that the vehicle starts driving on the plural-lane road based on the fact that the vehicle position was matched with a position corresponding to the entrance of the plural-lane road in the map data by the map matching processing section.

Moreover, another embodiment of an on-vehicle navigation system according to the present invention is characterized in that the second control section controls the route guidance action of the route guidance section such that guidance for the exiting authorized section nearest to the vehicle is performed in the case where the second route deviation judgment by the second route deviation judging section has been performed.

The characteristic object may include a road sign, a road marking, a guardrail, or a roadside structure that forms the road shape of the special lane. The characteristic object detecting section may include an on-vehicle camera.

PREFERRED EMBODIMENTS OF THE INVENTION

The following description will be made for embodiments of the on-vehicle navigation system according to the present invention by referring to FIG. 1 to FIG. 3.

Figure 1:
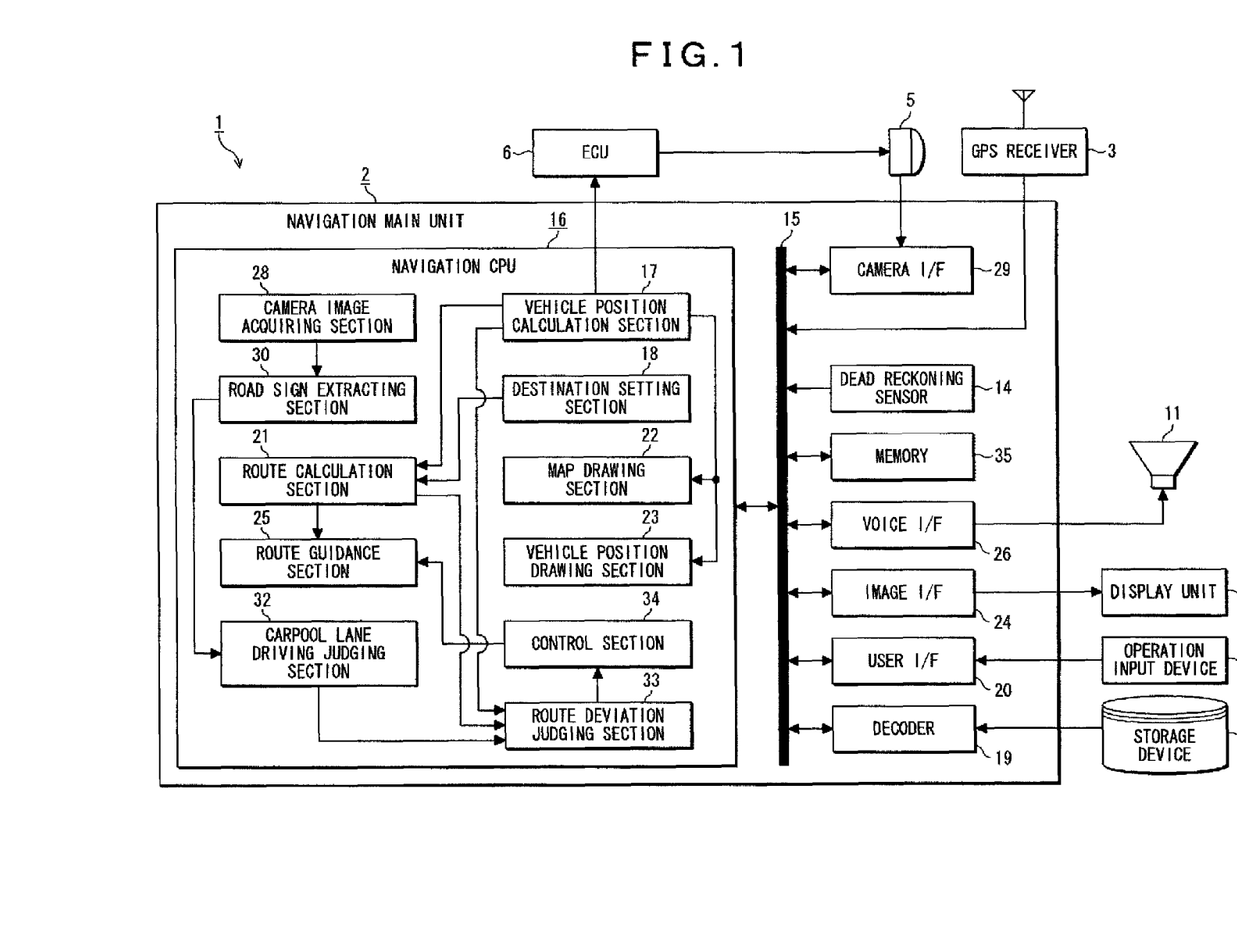
FIG. 1 is a block diagram showing an embodiment of an on-vehicle navigation system according to the present invention.

As shown in FIG. 1, an on-vehicle navigation system 1 in this embodiment generally consists of a navigation main unit 2, a GPS receiver 3, a camera 5, an ECU (electronic control unit) 6, a storage device 8, a display unit 10, a speaker 11, and an operation input device 12 with which a user inputs various necessary instructions for navigation to the navigation main unit 2, which are respectively connected to the navigation main unit 2.

The navigation main unit 2 is designed to perform various controls and processes for navigation to provide vehicle route guidance along a recommended route from a current position to a destination.

The camera 5 is attached to at least one of the front portion (grill portion, for example) and the rear portion (rear hatch portion, for example) of the vehicle so as to look down at the road surface from obliquely above, and the camera 5 is designed to capture the image of an object that exists in a predetermined view angle of at least one of the front and the rear of the vehicle. The camera 5 constitutes a part of a characteristic object detecting section, and in the case where the vehicle drives in a carpool lane of road with plural lanes, which includes a normal lane and a carpool lane as a special lane (hereinafter, simply referred to as a plural-lane road), the camera is designed to capture the image of a rhombus road sign that is drawn on the road surface of a carpool lane as a characteristic object unique to the carpool lane (hereinafter, referred to as a carpool lane road sign). Then, the camera 5 is designed to output the data of the captured image (hereinafter, referred to as a captured image) to the navigation main unit 2. The ECU 6 functions as an activating section and is designed to activate the camera 5 to start capturing images.

The GPS receiver 3 is designed to receive information regarding orbit and time from a GPS satellite (not shown) (hereinafter, referred to as GPS information) to output the received GPS information to the navigation main unit 2.

Various data including map data and programs necessary for navigation are stored in the storage device 8. Note that the map data contains road data and background data that are used in route guidance or the like by displaying a map or images on the display unit 10, route calculation data used in calculating a recommended route, and search data used in searching a destination, peripheral facilities, or the like. Further, the storage device 8 may be a hard disc drive, or a DVD drive on which a DVD is mounted, for example.

Further, the operation input device 12 may be a touch panel, a remote controller, a linear encoder or a rotary encoder of the display unit 10.

The navigation main unit 2 will now be described in detail. The navigation main unit 2 includes a dead reckoning sensor 14 that is made up of a gyro sensor, a vehicle speed sensor (vehicle speed pulse) and the like, and the dead reckoning sensor 14 is designed to detect the angular velocity and the speed of the vehicle and output a detection result.

A navigation CPU 16 as a main control section is connected to the dead reckoning sensor 14 via a system bus 15.

GPS information provided from the GPS receiver 3 and a detection result provided from the dead reckoning sensor 14 is designed to be provided to the vehicle position calculation section 17 via the system bus 15. The vehicle position calculation section 17 is designed to calculate a vehicle position as an absolute coordinate from GPS information received from the GPS receiver 3 (radio navigation). Further, the vehicle position calculation section 17, based on the detection result received from the dead reckoning sensor 14, is designed to calculate a vehicle position as a relative change amount from the previous vehicle position (dead reckoning).

Further, the storage device 8 is connected to the navigation CPU 16 via the system bus 15 and a decoder 19, and the vehicle position calculation section 17 is designed to read map data stored in the storage device 8 after it is decoded by the decoder 19.

The vehicle position calculation section 17 also functions as a map matching processing section, performing a map matching process where a calculated vehicle position is matched with a position on an appropriate road in the map data read from the storage device 8, and determines a vehicle position resulting from the map matching process to be a final calculation result.

A user interface 20 (user I/F in FIG. 1) is connected to the navigation CPU 16 through the system bus 15, and the operation result of the operation input device 12 is designed to be inputted to the user interface 20.

The navigation CPU 16 includes a destination setting section 18 as a function block, and an operation result for setting a destination is inputted to the destination setting section 18 as an operation result of the operation input device 12 via the user interface 20. The destination setting section 18 is designed to set a point corresponding to the inputted operation result as a destination. Search data in the map data stored in the storage device 8 is used in the setting of a destination.

Information of the vehicle position calculated by the vehicle position calculation section 17 (a vehicle position resulting from the map matching process in the case where the map matching process has been appropriately performed) and information of the destination set by the destination setting section 18 are inputted to a route calculation section 21. The route calculation section 21 is designed to perform route calculation for calculating a recommended route from the vehicle position to the destination based on the information of the inputted vehicle position and destination. In calculating the recommended route, the route calculation section 21 is designed to read route calculation data in the map data from the storage device 8 to use in route calculation.

Moreover, a calculation condition of the recommended route is inputted to the route calculation section 21 as an operation result of the operation input device 12. The calculation condition of the recommended route includes a calculation condition where a recommended route including a carpool lane is calculated, or a calculation condition where a recommended route not including the carpool lane is calculated. The route calculation section 21 is designed to calculate a recommended route satisfying the calculation condition.

An operation result for instructing the display of a map of an area specified by the user (an area around vehicle position, for example) is inputted to a map drawing section 22 as an operation result of the operation input device 12. The map drawing section 22 is designed to generate a map of the area specified by the user in response to the operation result of the operation input device 12, output the generated map to the display unit 10 via the system bus 15 and an image interface 24 (image I/F in FIG. 1) connected between the system bus 15 and the display unit 10, and perform map display.

A vehicle position drawing section 23 is designed to make an overlay display of a vehicle position mark showing the vehicle position on the map at the vehicle position, which has been displayed on the display unit 10.

Furthermore, a route guidance section 25 is designed to generate a guidance image for guiding the vehicle to the destination along the recommended route calculated by the route calculation section 21, display the generated guidance image on the display unit 10, and perform route guidance via the image. Note that the guidance image may include various images such as the image of the recommended route displayed on the map in an overlay manner, an enlarged intersection image, an image for guiding at the exiting authorized section of a carpool lane, or the like.

Further, the route guidance section 25 is designed to generate voice guidance for guiding the vehicle to the destination along the recommended route calculated by the route calculation section 21, perform speech output of the generated voice guidance to the speaker 11 via the system bus 15 and a voice interface 26 (voice I/F in FIG. 1) connected between the system bus 15 and the speaker 11, and perform route guidance via voice. Note that the voice guidance may include various instructions such as instructions for intersection right/left turn guidance or exiting the authorized section of a carpool lane.

In addition to the above-described constitution, the unit further includes a camera image acquiring section 28 that is part of the characteristic object detecting section together with the camera 5, and the camera image acquiring section 28 is designed to acquire the data of a captured image from the camera 5 via a camera interface 29 (camera I/F in FIG. 1) connected between the camera 5 and the system bus 15 and via the system bus 15.

Further, the unit includes a road sign extracting section 30 that is part of the characteristic object detecting section together with the camera 5 and the camera image acquiring section 28. The road sign extracting section 30 is designed to detect a carpool lane road sign by extracting the carpool lane road sign from the captured image of the camera 5 by image recognition performed on the data of the captured image acquired by the camera image acquiring section 28. Note that the carpool lane road sign is not detected when the captured image of the camera 5 does not contain the carpool lane road sign in the case where the vehicle does not drive in the carpool lane.

The unit includes a carpool lane driving judging section 32 as a special lane driving judging section, and the carpool lane driving judging section 32 is designed to perform a carpool lane driving judgment that the vehicle is driving in the carpool lane in the case where the carpool lane road sign has been detected by image recognition processing performed by the road sign extracting section 30.

Furthermore, the unit includes a route deviation judging section 33 designed to acquire the calculation result of the vehicle position calculation section 17, the calculation result of the route calculation section 21, and the judgment result of the carpool lane driving judging section 32. The route deviation judging section 33 recognizes that the recommended route contains a carpool lane based on the calculation result acquired from the route calculation section 21. Further, the route deviation judging section 33 recognizes that the vehicle is driving on a plural-lane road in the map data based on the result of the map matching process in the calculation result acquired from the vehicle position calculation section 17. Moreover, the route deviation judging section 33 is designed to acquire a transition of a driving lane with the changes of running distance regarding a recommended route on the plural-lane road (in other words, lane type) (hereinafter referred to as a transition of recommended route lane on the plural-lane road) and actual accumulated driving distance of the vehicle on the plural-lane road (hereinafter referred to as accumulated driving distance on the plural-lane road), from the calculation result acquired from the route calculation section 21 and the calculation result acquired from the vehicle position calculation section 17. Then, based on the transition of recommended route lane on the plural-lane road and the accumulated driving distance on the plural-lane road, the route deviation judging section 33 is designed to recognize that the vehicle is driving on a section where the vehicle is presumed to be driving in the carpool lane in the case of assuming that the vehicle does not deviate from a recommended route including the carpool lane (hereinafter, referred to as a carpool lane driving presumed section), as a predetermined driving section on the plural-lane road.

The route deviation judging section 33 is also designed to function as a first route deviation judging section by using the recognized items and the judgment result of the carpool lane driving judging section 32. Specifically, in the case where carpool lane driving judgment by the carpool lane driving judging section 32 is not performed in the carpool lane driving presumed section even though the recommended route calculated by the route calculation section 21 includes a carpool lane, the route deviation judging section 33 is designed to perform a first route deviation judgment that the vehicle deviates from the recommended route including the carpool lane. Note that the first route deviation judgment may be performed immediately when a carpool lane driving judgment is not performed at the start position of the carpool lane driving presumed section. When a continuous carpool lane driving judgment in an area from the start position to the vicinity of the end position of the carpool lane driving presumed section is not performed, the judgment may be performed in the vicinity of the end position. Alternatively, when a continuous carpool lane driving judgment is not performed in an area from the start position to a predetermined running distance of the carpool lane driving presumed section, the judgment may be performed after driving the predetermined running distance.

Moreover, the route deviation judging section 33 is designed to function as a second route deviation judging section by using the recognized items and the judgment result of the carpool lane driving judging section 32. Specifically, in the case where carpool lane driving judgment by the carpool lane driving judging section 32 has been performed on a plural-lane road even though the recommended route calculated by the route calculation section 21 does not include a carpool lane, the route deviation judging section 33 is designed to perform a second route deviation judgment that the vehicle deviates from the recommended route not including the carpool lane.

Note that the route deviation judging section 33 is designed to judge that the vehicle does not deviate from the recommended route including a carpool lane in the case where the recommended route includes a carpool lane and the carpool lane driving judgment by the carpool lane driving judging section 32 has been performed in the carpool lane driving presumed section. Further, in the case where the recommended route does not include a carpool lane and the carpool lane driving judgment by the carpool lane driving judging section 32 has not been performed on a plural-lane road, the route deviation judging section 33 is designed to judge that the vehicle does not deviate from the recommended route not including the carpool lane.

A control section 34 is designed to acquire the judgment result of the route deviation judging section 33. The control section 34 is designed to function as a first control section and control the route guidance action of the route guidance section 25 to prevent the guidance of the exiting authorized section of the carpool lane from being performed in the case where the first route deviation judgment by the route deviation judging section 33 has been performed. Further, the control section 34 is designed to function as a second control section and control the route guidance action of the route guidance section 25 so as to perform the guidance of the exiting authorized section of the carpool lane for returning to the recommended route in the case where the second route deviation judgment by the route deviation judging section 33 has been performed.

On the other hand, in the case where the route deviation judging section 33 has judged that the vehicle did not deviate from the recommended route including the carpool lane, the guidance of the exiting authorized section is performed by regular route guidance by the route guidance section 25 without the control of the control section 34. Further, in the case where the route deviation judging section 33 has judged that the vehicle did not deviate from the recommended route not including the carpool lane, the guidance of the exiting authorized section is not performed by regular route guidance by the route guidance section 25 without the control of the control section 34.

Therefore, according to this embodiment, the fact that the vehicle is not driving in the carpool lane and deviates from the recommended route is discriminated based on the fact that the carpool lane road sign is not detected even though the recommended route includes the carpool lane on a plural-lane road, which makes it possible to prevent the guidance of the exiting authorized section from being performed. Consequently, needless guidance of the exiting authorized section of the carpool lane can be avoided.

Further, according to this embodiment, the fact that the vehicle is driving in the carpool lane and deviates from the recommended route is discriminated based on the fact that the carpool lane road sign has been detected even though the recommended route does not include a carpool lane on a plural-lane road, which makes it possible to perform the guidance of the exiting authorized section. Consequently, necessary guidance of the exiting authorized section of the carpool lane can be securely performed.

Meanwhile, the control section 34 may perform the control of the route guidance section 25 such that the guidance of the nearest exiting authorized section is performed by the function as the second control section. With this method, the vehicle can be quickly returned to the recommended route.

In addition to the above-described constitution, further in this embodiment, in the case where the ECU 6 acquires the calculation result of the vehicle position calculation section 17 and the acquired calculation result shows that the vehicle position has been matched with a position corresponding to the entrance of a plural-lane road in the map data, the ECU is designed to detect that the vehicle starts driving on the plural-lane road. Then, the ECU 6 is designed to activate the camera 5 to make it possible to capture the image of a carpool lane road sign after detecting that the vehicle starts driving on the plural-lane road. Further, in this embodiment, the navigation CPU 16 has the function as of activating section (not shown), and this function is designed to activate the camera image acquiring section 28 and the road sign extracting section 30 in the state where a carpool lane road sign can be detected (extracted) after detecting that the vehicle starts driving on the plural-lane road.

Consequently, since the characteristic object detecting sections (5, 28, and 30) can be activated only when necessary with a simple method, power consumption for maintaining the activating state of the characteristic object detecting sections can be reduced.

Moreover, a memory 35 is connected to the system bus 15, and the memory 35 is used appropriately for data communicating in the navigation main unit 2 or temporary storage of programs.

Next, description will be made of the operation of this embodiment.

Figure 2:
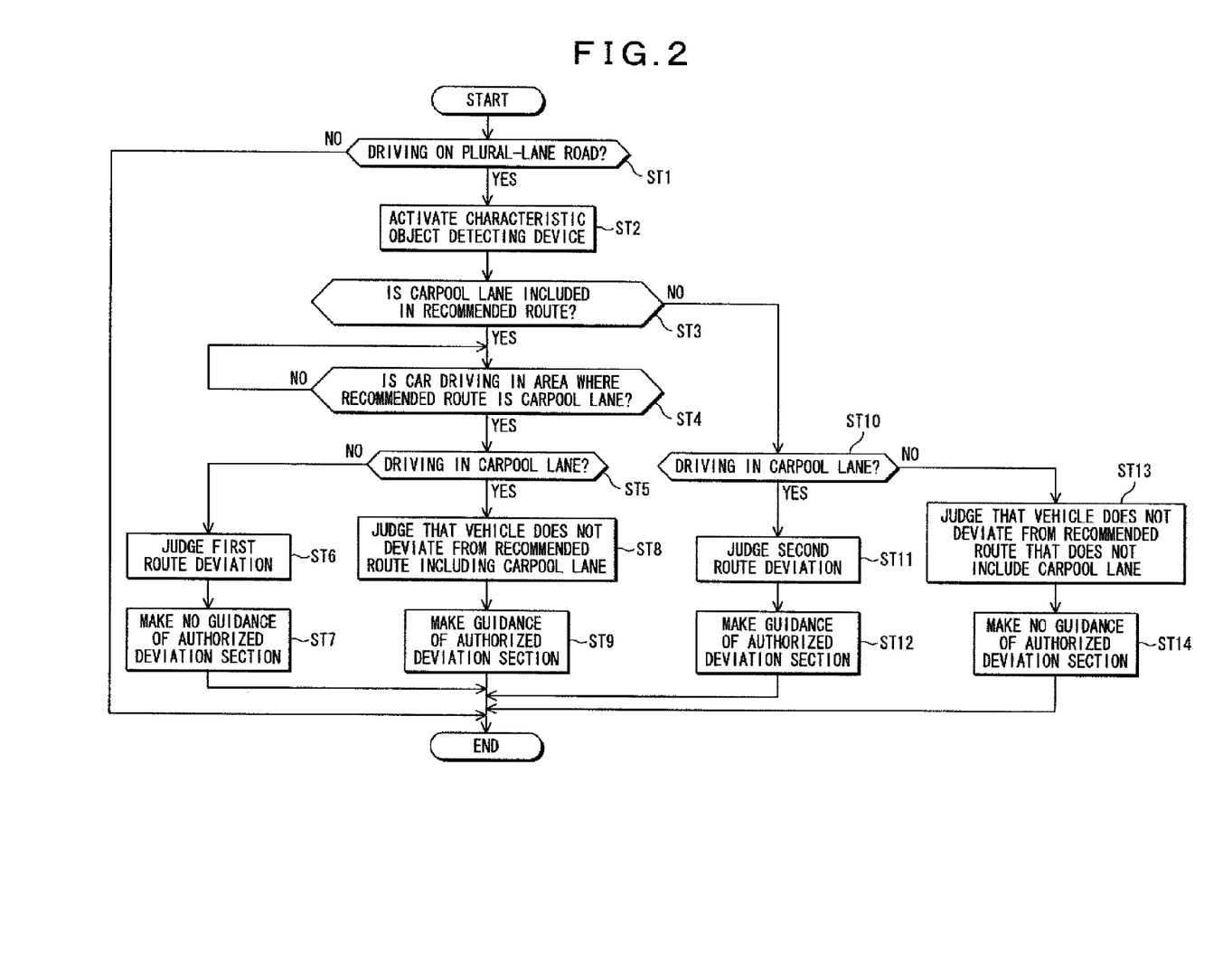
FIG. 2 is a flowchart of the operation of the embodiment of the on-vehicle navigation system according to the present invention.
Figure 3:
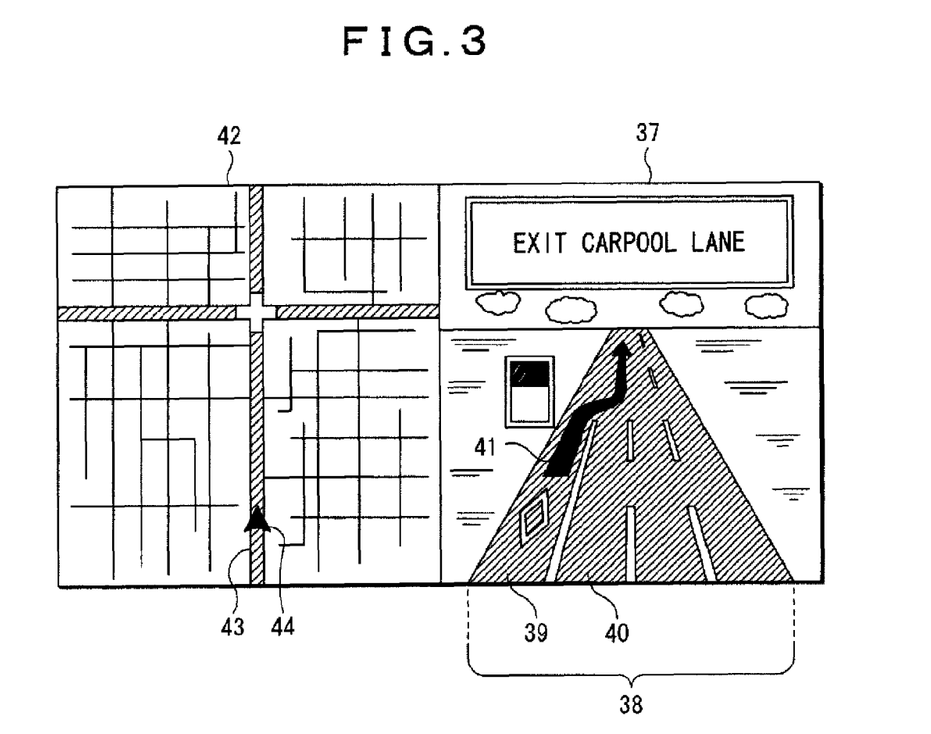
FIG. 3 is a view showing an example of a guidance image generated by the embodiment of the on-vehicle navigation system according to the present invention.

In this embodiment, as shown in step 1 (ST1) of FIG. 2, the ECU 6 first judges whether the vehicle starts driving on a plural-lane road based on whether the vehicle position has been matched with the entrance of a plural-lane road in the map data by the map matching process of the vehicle position calculation section 17. As a result of the judgment, in the case where the ECU 6 has detected that the vehicle started driving on a plural-lane road, the process moves to step 2 (ST2), whereas the process is ended in the case where it has been judged that the vehicle did not start driving on the plural-lane road. Although not shown, after step 1 (ST1), whether the vehicle is matched with a plural-lane road is continuously judged, and in the case where the vehicle position has not been matched with the plural-lane road before the vehicle exits the exit of the plural-lane road, it may be determined as an error at that point to stop further processing.

Next, in step 2 (ST2), the characteristic object detecting sections (5, 28, 30) are activated, and the procedure proceeds to step 3 (ST3). In step 3 (ST3), whether a carpool lane is included in the recommended route is judged by the route deviation judging section 33 based on the calculation result of the route calculation section 21. The procedure proceeds to step 4 (ST4) when a carpool lane is included, and proceeds to step 10 (ST10) when it is not included.

The processing in and after step 4 (ST4) will be described first. In step 4 (ST4), the route deviation judging section 33 acquires the transition of a recommended route lane on the plural-lane road and the accumulated driving distance on the plural-lane road from the calculation result of the route calculation section 21 and the calculation result of the vehicle position calculation section 17. Whether the vehicle is driving in the carpool lane driving presumed section is judged based on the acquired transition of the recommended route lane on the plural-lane road and the accumulated driving distance on the plural-lane road. Specifically, in the case where the transition of a recommended route lane on the plural-lane road is that a recommended route between a point having the running distance 1 km from the starting point of the plural-lane road and a point having the running distance 2 km from the starting point of the plural-lane road only includes the carpool lane, and the accumulated driving distance on the plural-lane road indicates a point having the running distance 1.5 km from the starting point of the plural-lane road, the route deviation judging section 33 judges that the vehicle is driving in the carpool lane driving presumed section.

As a result of this judgment, the procedure proceeds to step 5 (ST5) in the case where the route deviation judging section 33 has recognized that the vehicle is driving in the carpool lane driving presumed section, or step 4 (ST4) is repeated in the case where it is judged that the vehicle is not driving in the carpool lane driving presumed section.

In step 5 (ST5), the carpool lane driving judging section 32 judges whether the vehicle is driving in the carpool lane based on whether the carpool lane road sign has been detected. When the vehicle is driving in the lane, the procedure proceeds to step 8 (ST8) after making the judgment (carpool lane driving judgment), whereas the procedure proceeds to step 6 (ST6) when the vehicle is not driving in the lane.

In step 6 (ST6), the route deviation judging section 33 performs the first route deviation judgment and the procedure proceeds to step 7 (ST7).

In step 7 (ST7), the control section 34 controls the route guidance action of the route guidance section 25 to prevent the guidance of the exiting authorized section of the carpool lane from being performed even if the vehicle position is matched with the end position of the carpool lane driving presumed section, and ends the process.

On the other hand, in step 8 (ST8), the route deviation judging section 33 judges that the vehicle does not deviate from the recommended route including the carpool lane and the procedure proceeds to step 9 (ST9).

In step 9 (ST9), the guidance of the exiting authorized section of the carpool lane is performed by the regular route guidance action of the route guidance section 25 without the control of the control section 34, and then the process is ended.

The processing in and after step 10 (ST10) will now be described. In step 10 (ST10), the carpool lane driving judging section 32 judges whether the vehicle is driving in the carpool lane based on whether the carpool lane road sign has been detected. When the vehicle is driving in the lane, the procedure proceeds to step 11 (ST11) after performing the carpool lane driving judgment, whereas the procedure proceeds to step 13 (ST13) when the vehicle is not driving in the lane.

In step 11 (ST11), the route deviation judging section 33 performs the second route deviation judgment and the procedure proceeds to step 12 (ST12).

In step 12 (ST12), the control section 34 controls the route guidance action of the route guidance section 25 such that the guidance of the exiting authorized section of the carpool lane is performed when the vehicle has been matched with the end position of the carpool lane driving presumed section or when the image of an object showing that the exiting authorized section of carpool lane is near (such as a road marking) has been captured by the camera 5, and ends the process. Consequently, for example, as shown in FIG. 3, even in the case where the carpool lane is not included in the recommended route, a guidance image 37 for guiding the exiting authorized section of carpool lane can be displayed. Meanwhile, it is assumed that the guidance image 37 in FIG. 3 is an image that includes an arrow 41 prompting the exiting to the nearest normal lane 40 from the carpool lane 39 in the four-lane road 38. Further, at this point, the map drawing section 22 may display a map 42 around the vehicle position including the image of the plural-lane road 43 on the left of the guidance image 37, and a vehicle position mark 44 is displayed on the map 42 in an overlay manner by the vehicle position drawing section 23.

On the other hand, in step 13 (ST13), the route deviation judging section 33 judges that the vehicle does not deviate from the recommended route not including a carpool lane and the procedure proceeds to step 14 (ST14).

In step 14 (ST14), the guidance of the exiting authorized section of the carpool lane is not performed by the regular route guidance action of the route guidance section 25 without the control of the control section 34, and the process is ended.

As described above, according to this embodiment, after discriminating simply and accurately the driving condition (driving lane) of the vehicle on the plural-lane road based on a carpool lane road sign, the guidance of a necessary exiting authorized section can be securely performed while the guidance of a needless exiting authorized section is avoided, and eventually, the user can receive comfortable and efficient route guidance to the destination.

Note that the present invention is not limited to the above-described embodiment, but various modifications can be made. For example, although carpool lane road signs were used as a characteristic object in the above-described embodiment, instead of the carpool lane road signs or together with the carpool lane road signs, at least one of a road marking on the carpool lane, a guardrail separating the carpool lane from the normal lane, and a roadside structure forming the road shape of the carpool lane (curb, shrubbery, bank or the like, for example) may be used as the characteristic object. Further, for example, if it becomes possible in the future to detect that the vehicle is driving in the carpool lane through communication via communication means such as an optical beacon, the present invention may be applied by using signals (intangible object) distributed from the communication means as a characteristic object. Even in such a case, it is possible to achieve a beneficial effect similar to the above-described embodiments.

Moreover, as a characteristic object detecting section, a unit other than the camera 5, such as a radar or the like, may be used.

According to the on-vehicle navigation system of the present invention, on a plural-lane road having a normal lane and a special lane where advancing from the normal lane in a predetermined advancing authorized section and exiting to the normal lane in a predetermined exiting authorized section are authorized, the system discriminates that the vehicle is not driving in the special lane and deviates from the recommended route including the special lane based on the fact that a special lane characteristic object unique to the special lane has not been detected to make it possible to prevent the guidance of the exiting authorized section from being performed. On the other hand, on the plural-lane road, the system discriminates that the vehicle is driving in the special lane and deviates from the recommended route not including the special lane based on the fact that the characteristic object has been detected to make it possible to perform the guidance of the exiting authorized section. Consequently, after accurately discriminating the driving condition of the vehicle on the plural-lane road, the guidance of a necessary exiting authorized section can be securely performed while the guidance of a needless exiting authorized section can be avoided, and the user eventually can receive comfortable and efficient route guidance to the destination.

Further, with the vehicle position detection accuracy currently obtainable by radio navigation where the vehicle position is computed by using GPS, or dead reckoning where the vehicle position is computed by using a dead reckoning sensor (gyro sensor or the like), there may be cases that it is impossible to precisely discriminate which of the special lane or the normal lane the vehicle is driving in, but when the detection of the characteristic object is used as a discriminating standard of the driving lane as in the present invention, it becomes possible to securely discriminate which of the special lane or the normal lane the vehicle is driving in without depending on vehicle position detection accuracy.

According to one aspect of an on-vehicle navigation system incorporating the present invention, the fact that the vehicle deviates from the recommended route including the special lane can be discriminated more simply and appropriately based on whether a characteristic object has been detected in a section where the vehicle is presumed to be driving in the special lane, and the guidance of a needless exiting authorized section can be avoided simply and securely. Moreover, according to another aspect of an on-vehicle navigation system incorporating the present invention, since it is possible to simply recognize that the vehicle is driving in the plural-lane road based on map data, the judgment of deviation from the recommended route on the assumption of such a recognized item can also be performed simply.

According to another aspect of an on-vehicle navigation system incorporating the present invention, by activating the characteristic object detecting section only when necessary, power consumption for maintaining the activating state of the characteristic object detecting section can be reduced. Further, optimum activation timing of the characteristic object detecting section can be simply controlled, and costs can be reduced.

According to another aspect of an on-vehicle navigation system incorporating the present invention, in the case where the vehicle deviates from the recommended route not including the special lane and is driving in the special lane, the system can quickly return the vehicle to the recommended route.

Furthermore, according to another aspect of an on-vehicle navigation system incorporating the present invention, based on whether a special lane road sign has been detected, by discriminating whether the vehicle is driving in the special lane and whether the vehicle deviates from the recommended route, the avoidance of guiding a needless exiting authorized section and the guidance of a necessary exiting authorized section can be performed simply and securely.

Alternatively, by discriminating whether the vehicle is driving in the special lane and whether the vehicle deviates from the recommended route based on whether a special lane road marking has been detected, the avoidance of guiding a needless exiting authorized section and the guidance of a necessary exiting authorized section can be performed simply and securely.

Alternatively, by discriminating whether the vehicle is driving in the special lane and whether the vehicle deviates from the recommended route based on whether a special lane guardrail has been detected, the avoidance of guiding a needless exiting authorized section and the guidance of a necessary exiting authorized section can be performed simply and securely.

Alternatively, by discriminating whether the vehicle is driving in the special lane and whether the vehicle deviates from the recommended route based on whether a special lane roadside structure has been detected, the avoidance of guiding a needless exiting authorized section and the guidance of a necessary exiting authorized section can be performed simply and securely.

Further, by discriminating whether the vehicle is driving in the special lane and whether the deviates from the recommended route based on whether a characteristic object unique to the special lane has been detected, guiding a needless exiting authorized section can be avoided and the guidance of a necessary exiting authorized section can be performed simply and securely. Moreover, by discriminating whether the vehicle is driving in the carpool lane and whether the vehicle deviates from the recommended route based on whether a characteristic object unique to the carpool lane has been detected by the characteristic object detecting section including the on-vehicle camera, the avoidance of a needless guidance of the exiting authorized section of the carpool lane and the guidance of a necessary exiting authorized section can be performed simply and securely.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle navigation system comprising:
   a characteristic object detecting section configured for detecting a special lane characteristic object in the case where a vehicle drives in the special lane of a plural-lane road having a normal lane and said special lane where advancing from said normal lane in a predetermined advancing authorized section and exiting to said normal lane in a predetermined exiting authorized section are authorized;
   a route searching section configured for searching a recommended route to a destination;
   a route guidance section configured for performing route guidance of said vehicle to said destination including the guidance of said exiting authorized section along said recommended route searched by the route searching section;
   a special lane driving judging section configured for performing special lane driving judgment that said vehicle is driving in said special lane in the case where said characteristic object has been detected by said characteristic object detecting section;
   a first route deviation judging section configured for performing a first route deviation judgment that said vehicle deviates from said special lane on said recommended route including said special lane in the case where said special lane driving judgment by said special lane driving judging section is not performed in a predetermined driving section in said plural-lane road even though said special lane is included in said recommended route searched by said route searching section;
   a second route deviation judging section configured for performing a second route deviation judgment that said vehicle deviates from said recommended route not including said special lane in the case where said special lane driving judgment by said special lane driving judging section is performed in said plural-lane road even though said special lane is not included in said recommended route searched by said route searching section;
   a first control section configured for controlling the route guidance action of said route guidance section to prevent the guidance of said exiting authorized section from being performed in the case where said first route deviation judgment by said first route deviation judging section has been performed; and
   a second control section configured for controlling the route guidance action of said route guidance section so as to perform the guidance of said exiting authorized section for returning to the recommended route in the case where said second route deviation judgment by said second route deviation judging section has been performed.

2. The on-vehicle navigation system according to claim 1, wherein
   a predetermined driving section in said plural-lane road is a driving section where said vehicle is presumed to be driving in said special lane when said vehicle does not deviate from said recommended route including said special lane based on the transition of driving lane with the running distance regarding said recommended route in said plural-lane road and an accumulated driving distance of said vehicle in said plural-lane road.

3. The on-vehicle navigation system according to claim 1, said system comprising:
   a map data storage device in which map data is stored;
   a vehicle position detecting section configured for detecting a vehicle position by using at least one of dead reckoning and radio navigation; and
   a map matching processing section configured for performing a map matching process by which the vehicle position is matched with a position on an appropriate road in said map data by using said vehicle position detected by the vehicle position detecting section and said map data stored in said map data storage device, wherein
   said first route deviation judging section and said second route deviation judging section are configured to recognize that said vehicle is driving on said plural-lane road based on the result of said map matching process by said map matching processing section.

4. The on-vehicle navigation system according to claim 3, said system further comprising:
   an activating section configured for activating said characteristic object detecting section for detecting said characteristic object after detecting that said vehicle starts driving on said plural-lane road.

5. The on-vehicle navigation system according to claim 4, wherein
   said activating section is configured to detect that said vehicle starts driving on said plural-lane road based on the fact that said vehicle position was matched with a position corresponding to the entrance of said plural-lane road in said map data by said map matching processing section.

6. The on-vehicle navigation system according to claim 1, wherein
   in the case where said second route deviation judgment by said second route deviation judging section has been performed, said second control section controls the route guidance action of said route guidance section such that the guidance of said exiting authorized section nearest to the vehicle is performed.

7. The on-vehicle navigation system according to claim 1, wherein
   said characteristic object includes a road sign.

8. The on-vehicle navigation system according to claim 1, wherein
   said characteristic object includes a road marking.

9. The on-vehicle navigation system according to claim 1, wherein
   said characteristic object includes a guardrail.

10. The on-vehicle navigation system according to claim 1, wherein
    said characteristic object includes a roadside structure that forms the road shape of said special lane.

11. The on-vehicle navigation system according to claim 1, wherein
    said characteristic object detecting section includes an on-vehicle camera.

12. The on-vehicle navigation system according to claim 1, wherein
    said special lane is a carpool lane.

13. A method of operating an on-vehicle navigation system comprising:
    detecting a special lane characteristic object in the case where a vehicle drives in the special lane of a plural-lane road having a normal lane and said special lane where advancing from said normal lane in a predetermined advancing authorized section and exiting to said normal lane in a predetermined exiting authorized section are authorized;

searching a recommended route to a destination; performing route guidance of said vehicle to said destination including the guidance of said exiting authorized section along said recommended route;

judging that said vehicle is driving in said special lane in the case where said characteristic object has been detected;

judging that said vehicle deviates from said special lane on said recommended route including said special lane in the ease where said special lane driving judgment is not performed in a predetermined driving section in said plural-lane road even though said special lane is included in said recommended route;

judging that said vehicle deviates from said recommended route not including said special lane in the case where said special lane driving judgment is performed in said plural-lane road even though said special lane is not included in said recommended route;

controlling the route guidance to prevent the guidance of said exiting authorized section from being performed in the case where said first route deviation judgment has been performed; and controlling the route guidance so as to perform the guidance of said exiting authorized section for returning to the recommended route in the case where said second route deviation judgment has been performed.

14. The method according to claim 13, further comprising:
storing map data;
detecting a vehicle position by using at least one of dead reckoning and radio navigation; and
performing a map matching process by which the vehicle position is matched with a position on an appropriate road in said map data by using said detected vehicle position and said stored map data, wherein
it is determined said vehicle is driving on said plural-lane road based on the result of said map matching process.

15. The method according to claim 14, further comprising:
enabling said characteristic object detecting step after detecting that said vehicle starts driving on said plural-lane road.

16. The method according to claim 15, wherein
it is detected that said vehicle starts driving on said plural-lane road based on the fact that said vehicle position was matched with a position corresponding to the entrance of said plural-lane road in said map data by said map matching process.

17. The method according to claim 13, wherein
in the case where said second route deviation judgment has been performed, controlling the route guidance such that the guidance of said exiting authorized section nearest to the vehicle is performed.

18. The method according to claim 13, wherein
said characteristic object includes a road sign.

19. The method according to claim 13, wherein
said characteristic object is detected using an on-vehicle camera.

20. The method according to claim 13, wherein
said special lane is a carpool lane.

* * * * *